(12) United States Patent
Korn et al.

(10) Patent No.: US 7,739,296 B2
(45) Date of Patent: Jun. 15, 2010

(54) SYSTEM AND METHOD FOR VIRTUALIZATION OF RELATIONAL STORED PROCEDURES IN NON-NATIVE RELATIONAL DATABASE SYSTEMS

(75) Inventors: Stefan Korn, Neubrandenburg (DE); Jacques Joseph Labrie, Sunnyvale, CA (US); Eileen Tien Lin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 11/484,971

(22) Filed: Jul. 12, 2006

(65) Prior Publication Data

US 2008/0016080 A1 Jan. 17, 2008

(51) Int. Cl.
*G06F 7/00* (2006.01)
*G06F 17/30* (2006.01)

(52) U.S. Cl. .................. 707/770; 707/999.01; 709/208; 709/209; 709/210; 709/211

(58) Field of Classification Search ........................ None
See application file for complete search history.

(56) References Cited

U.S. PATENT DOCUMENTS

| | | | | |
|---|---|---|---|---|
| 5,596,744 A | | 1/1997 | Dao et al. .................... | 395/610 |
| 5,703,880 A | * | 12/1997 | Miura ......................... | 370/465 |
| 5,768,589 A | | 6/1998 | Bradley et al. .............. | 395/684 |
| 5,903,887 A | * | 5/1999 | Kleewein et al. ............... | 707/2 |
| 6,236,997 B1 | | 5/2001 | Bodamer et al. .............. | 707/10 |
| 6,295,491 B1 | * | 9/2001 | Ayoub et al. .................. | 701/33 |
| 6,938,052 B2 | | 8/2005 | Mild et al. ............... | 707/104.1 |
| 2002/0016814 A1 | | 2/2002 | Convent et al. ............. | 709/203 |
| 2002/0033844 A1 | * | 3/2002 | Levy et al. ................... | 345/744 |
| 2004/0006563 A1 | | 1/2004 | Zwiegincew et al. .......... | 707/10 |
| 2004/0068453 A1 | * | 4/2004 | Duan et al. ................... | 705/35 |
| 2004/0158578 A1 | * | 8/2004 | Lee et al. ................ | 707/103 R |
| 2004/0199636 A1 | | 10/2004 | Brown et al. ................ | 709/227 |
| 2005/0055385 A1 | * | 3/2005 | Sinha et al. ................. | 707/203 |
| 2005/0065912 A1 | * | 3/2005 | Cafrelli et al. ................. | 707/3 |

\* cited by examiner

*Primary Examiner*—Khanh B Pham
*Assistant Examiner*—Azam M. Cheema
(74) *Attorney, Agent, or Firm*—VanLeeuwen & VanLeeuwen; Elissa Y. Wang

(57) ABSTRACT

A system, method, and program product are provided that identifies a remote stored procedure stored in a remote database management system, and automatically generates a local stored procedure stored in a local database management system. To automatically generate the local stored procedure, local and remote metadata are gathered corresponding, respectively, to a local database management system and a remote database management system. The remote metadata is used to create a call statement to the remote stored procedure. The created invocation method maps input values, input to the local stored procedure, to input parameters of the remote stored procedure. Results in the local stored procedure are set by mapping the data returned from the remote stored procedure to the corresponding return values (e.g., parameters and result sets) in the local stored procedure values.

17 Claims, 6 Drawing Sheets

SYSTEM AND METHOD FOR VIRTUALIZATION OF RELATIONAL STORED PROCEDURES IN NON-NATIVE RELATIONAL DATABASE SYSTEMS

BACKGROUND OF THE INVENTION

1. Technical Field

The present invention relates in general to a system and method for accessing remote databases. More particularly, the present invention relates to a system and method that virtualizes stored procedures to allow the use of non-native stored procedures from a database environment.

2. Computer Program Listing Appendix

A Computer Program Listing Appendix has been filed concurrently with the present application and is incorporated by reference in its entirety, herein. Listings of four computer programs in the Java programming language are included on the CD-ROM in compliance with CFR §1.96 and MPEP §608.05. Two identical copies of the CD-ROM, labeled "Copy 1" and "Copy 2," have been included.

The files "INIT", "CREATEJAVASOURCECODE.TXT", and "DB2ORACLEDATATYPEMAPPING.TXT," were created on or before Jul. 21, 2005, and the program named "DB2SPNAME.TXT" was created on or before Jun. 7, 2006.

3. Description of the Related Art

Relational database applications have the ability to run "stored procedures" that are essentially, software applications with SQL statements and other control-flow language instructions. While stored procedures usually include SQL statements, they differ from SQL statements in that stored procedures are generally pre-compiled by the database management system (DBMS). Stored procedures are widely used by relational database application developers. Some of this popularity stems from the pre-compilation aspects of stored procedures, as mentioned above.

As indicated above, stored procedures are used with a particular database management system (DBMS). A DBMS is a collection of programs that enables the user to store, modify, and extract information from a database. There are many different types of DBMSs, ranging from small systems that run on personal computers to huge systems that run on mainframes. There are also many different vendors that supply DBMSs, such as International Business Machines Corporation (IBM), Oracle Corporation, Microsoft Corporation, Teradata, Sybase, Inc. and others. These DBMS vendors often offer multiple DBMS products to serve different needs and markets. Consequently, each DBMS has its strengths and weaknesses when compared with other DBMSs.

Stored procedures in most modern database environments have many similarities to other programming languages. In particular, stored procedures are often able to accept input parameters and return multiple values in the form of output parameters to the calling procedure or batch; and contain programming statements that perform operations in the database, including calling other procedures; return a status value to a calling procedure or batch to indicate success or failure (and the reason for the failure).

While stored procedures are widely used, there are some shortcomings to their use. One shortcoming faced by relational database application developers is that stored procedures are specific to a particular DBMS. In other words, a stored procedure native to a first type of DBMS cannot inherently call stored procedures that are native to a second, different, type of DBMS.

What is needed, therefore, is a system, method, and program product that virtualizes a stored procedure native to a remote DBMS so that it can be integrated with a local remote procedure. What is further needed is a system, method, and program product that runs the remote stored procedure on the remote DBMS and returns the resulting data to the local stored procedure in a format usable by the local stored procedure.

SUMMARY

It has been discovered that the aforementioned challenges are resolved using a system, method, and program product that identifies a remote stored procedure stored in a remote database management system, and automatically generates a local stored procedure stored in a local database management system. To automatically generate the local stored procedure, local and remote metadata are gathered corresponding, respectively, to a local database management system and a remote database management system. The remote metadata is used to create a call statement to the remote stored procedure. The created call statement maps input values, input to the local stored procedure, to input parameters of the remote stored procedure. Values in the local stored procedure are set by mapping the results from the remote stored procedure to the local stored procedure values.

In one embodiment, the system, method, and program product searches a database catalog corresponding to the remote database management system before automatically generating the local stored procedure. A search result is received and processed in order to generate a call signature that corresponds to the remote stored procedure.

In another embodiment, the system, method, and program product generates a connection string corresponding to the remote database management system. Data handling code is then generated to handle the remote stored procedure results. In one embodiment, the data handling code includes instructions for changing an output data type of the remote database management system to an data type that is acceptable by the local database management system.

In another embodiment, the system, method, and program product executes the generated local stored procedure which calls the remote stored procedure using the created call statement. The local stored procedure then receives results from the remote stored procedure. The values that are returned can be transformed to correspond to a data type that is acceptable to the local database management system. In one embodiment, the transformed values are displayed to a user of the local stored procedure.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
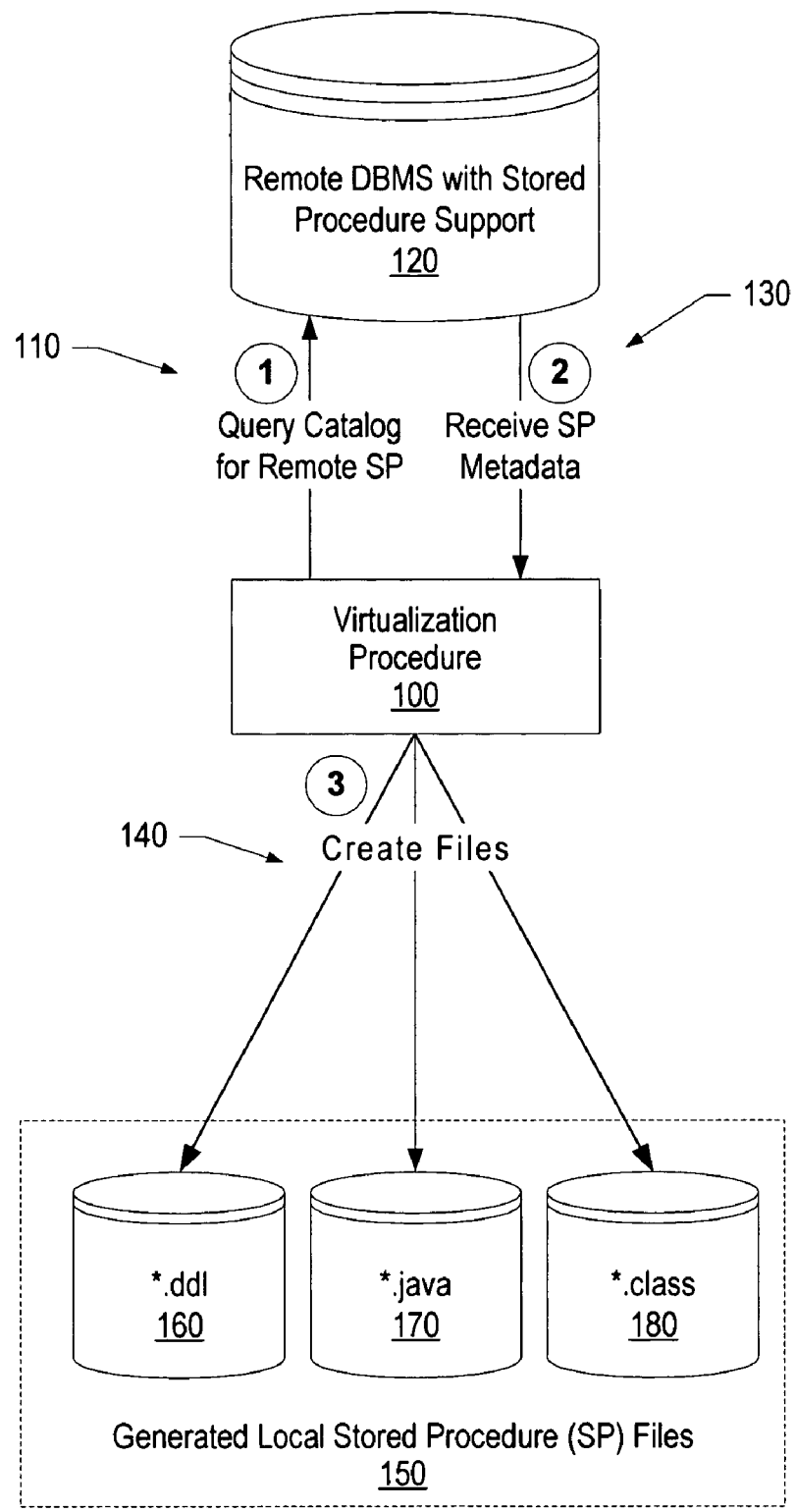
FIG. 1 is a system diagram showing the virtualization procedure querying and retrieving data from a remote database management system and creating local stored procedure files.

FIG. 1 is a system diagram showing the virtualization procedure querying and retrieving data from a remote database management system and creating local stored procedure files. Virtualization procedure 100 is used to extract data from remote database management system 120 that has stored procedure support. In other words, remote database management system 120 is a database management system that can store and execute stored procedures. An example of a stored procedure included in remote database management system 120 would be a stored procedure that accesses and manipulates data, such as a database table, being managed by database management system 120.

At step 110, the virtualization procedure queries the database catalog maintained by remote database management system 120. In one embodiment, the user provides the virtualization procedure a name or identifier of a stored procedure managed by remote database management system 120 and this name or identifier is used when querying (searching) the remote database management system's catalog.

At step 130, the virtualization procedure receives stored procedure metadata corresponding to the remote stored procedure being managed by remote database management system 120. Remote stored procedure metadata (remote metadata) is data describing the remote stored procedure as well as the remote database management system.

At step 140, the remote metadata that was received is used to create local stored procedure 150. In one embodiment, a "data definition" file (*.ddl 160) is created with data definition statements that will register the generated local stored procedure with the local database management system. In a Java implementation, the java file(s) (*.java 170) and class file(s) (*.class 180) include instructions, in the Java programming language for the local stored procedure that was generated.

Figure 2:
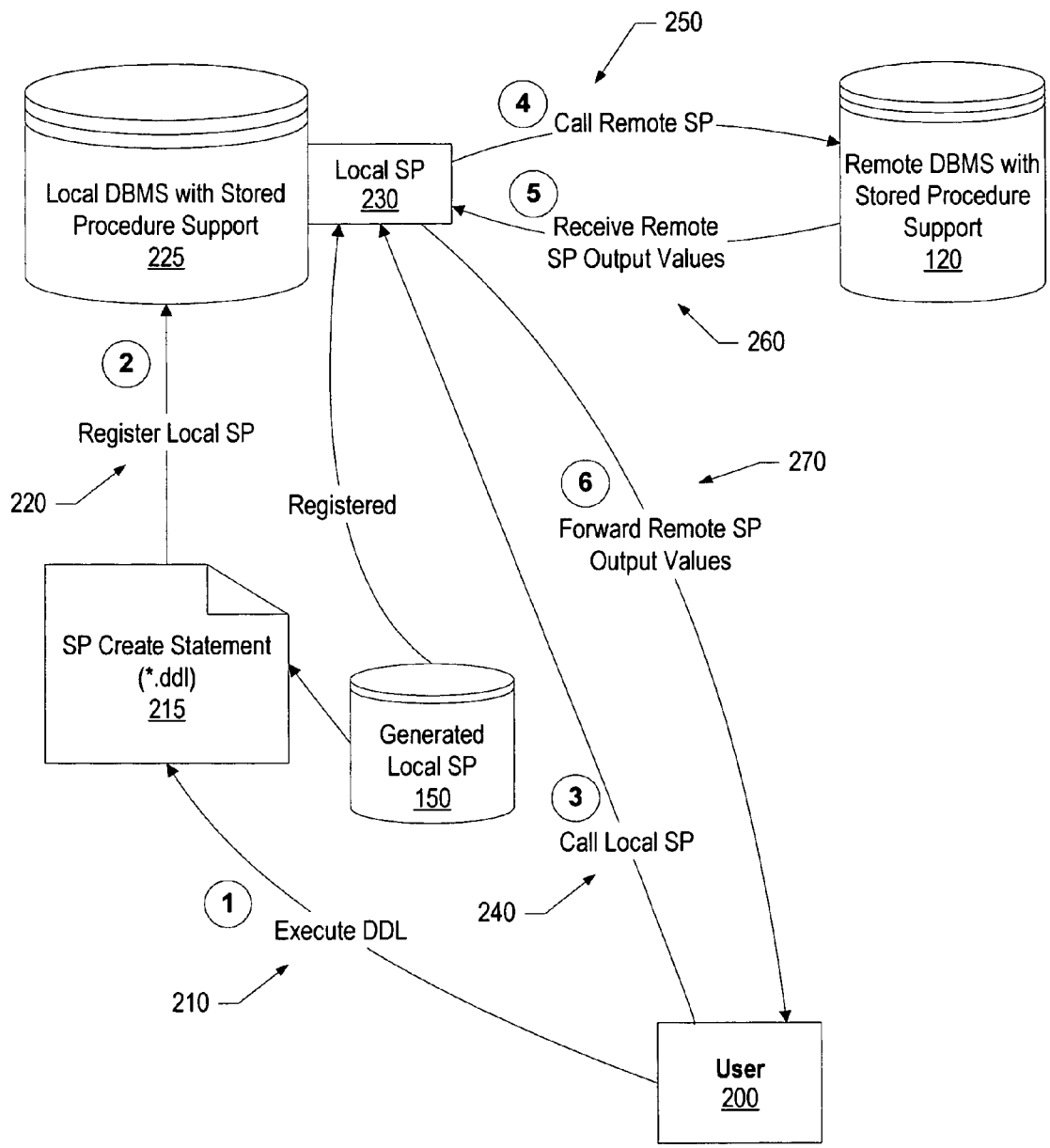
FIG. 2 is a system diagram showing a user interacting with a local stored procedure that calls a remote stored procedure and receives resulting values from the remote database management system.

FIG. 2 is a system diagram showing a user interacting with a local stored procedure that calls a remote stored procedure and receives resulting values from the remote database management system. After local stored procedure 150 has been generated, using the steps outlined in FIG. 1, the local stored procedure is used by user 200 using the steps outlined in FIG. 2. First, the user executes the data definition file (*.ddl). The data definition file includes a "create" statement 215 that is used, at step 220, to register the generated local stored procedure with local database management system 225. This results in local stored procedure 230 that is registered with local database management system 225.

At step 240, the user calls local stored procedure 230 that has been registered with local database management system 225. The call to the local stored procedure can either be a direct invocation by the user, such as by using a keyboard to enter the local stored procedure name, or the call can be an invocation through another stored procedure used by the user. In this manner, a single local stored procedure that accesses a remote stored procedure in remote database management system 120 can be called by a variety of local stored procedures managed by local database management system 225.

At step 250, local stored procedure 230 (registered with the local database management system) calls the remote stored procedure that is managed by remote database management system 120. Local stored procedure 230 includes code to connect to the remote database management system as well as code to call the remote stored procedure using the correct syntax needed to call the remote stored procedure. The connection code and call syntax was generated by the virtualization procedure shown in FIG. 1.

At step 260, local stored procedure 230 receives results from the remote stored procedure that was called. The results that are received are mapped to local stored procedure values that conform to the local database management system. For example, if data returned by the remote database management system is monetary data in a "currency" data type, but the local database management system does not have a "currency" data type, then the local stored procedure transforms the "currency" data type to another data type, such as a decimal data type that is appropriate to the local database management system.

At step 270, the values returned from the remote stored procedure and mapped to local stored procedure values, are returned to user 200. As mentioned before, local stored procedure 230 can be called from another local stored procedure, so the values returned in step 270 can be used by the stored procedure that called local stored procedure 230. The user is also able to display values from the remote database management system that were generated by the remote stored procedure. For example, the remote stored procedure can retrieve data from tables in the remote database management system and this data, once returned to user 200, can be displayed.

Figure 3:
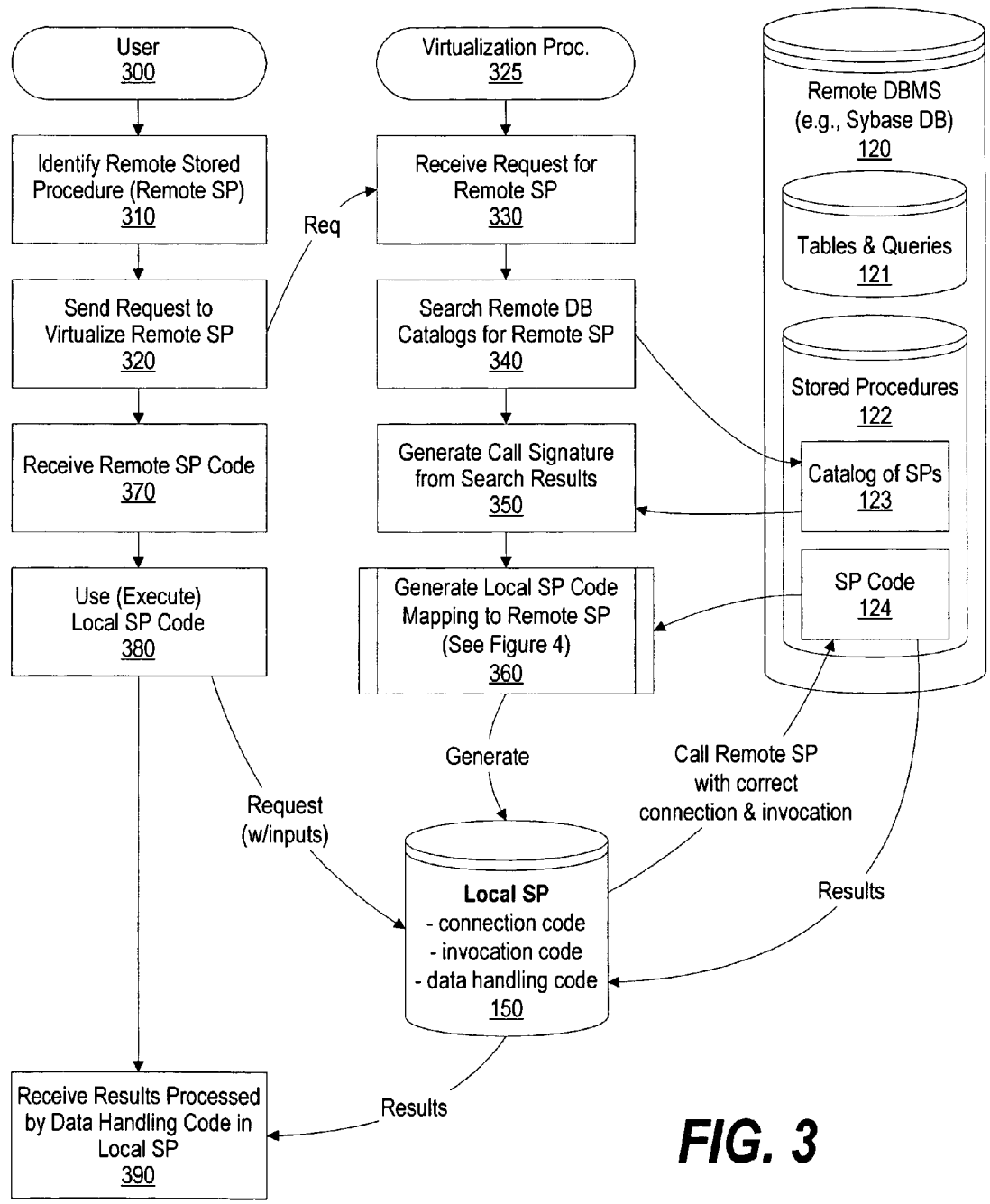
FIG. 3 is a flowchart showing the steps taken between the user, the virtualization procedure, and the database management systems to generate a local stored procedure that calls a remote stored procedure.

FIG. 3 is a flowchart showing the steps taken between the user, the virtualization procedure, and the database management systems to generate a local stored procedure that calls a remote stored procedure. User processing commences at 300 whereupon, at step 310, the user identifies a remote stored procedure that the user wishes to execute. The remote stored procedure being a stored procedure that is managed by a remote database management system. A "remote" database management system is simply a database management system that is different than another database management system being used by the user. The database management system that is being used by the user for the local stored procedure is referred to as the "local" database management system. The local and remote database management system can each reside on the same computer system or they can each reside on different computer systems.

At step 320, the user sends a request to the virtualization procedure. The request include some information about the remote database management system and the remote stored procedure that the user wants to use. In one embodiment, the user provides the virtualization procedure with the following information:

RDatabaseType: Identifies the type of relational database where remote stored procedure exists.

RConnectionString: The JDBC connection string which connects you to the remote database where the stored procedure is registered.

RSchemaName: The schema name of the remote stored procedure.
(Only needed if a schema name was defined for the remote SP)

RPackageName: The package name of the remote stored procedure.
(Only needed if a package name was defined for the remote stored procedure)

RSPName: The name of the remote stored procedure.

RUsername: A valid remote database user name which is able to get the metadata information about the remote stored procedure.

RPassword: The matching password for "Username".

LDatabaseType: Identifies the type of relational database that the local stored procedure should be generated as.

LSchemaName: The local schema name for the stored procedure which will be generated by this invention.
(Only needed if a schema names are used on local relational database systems).

LPackageName: The local package name for the stored procedure which will be generated by this invention.
(Only needed if a package name is on local relational database systems).

LSPName: The name of the local stored procedure which will be generated by this invention.

LDirectory: The directory where the generated '.ddl', '.java' and '.class' files will be stored.

The virtualization procedure commences at 325 whereupon, at step 330, the virtualization procedure receives the request from the user for the remote stored procedure. At step 340, the virtualization procedure sends a query to remote database management system 120 and searches the remote database management system for the requested remote stored procedure. Remote database management system 120 includes tables and queries 121 as well as stored procedures 122. Remote database management system 120 maintains catalog information 123 which includes a listing of the stored procedures maintained by the remote database management system. In the example shown, one of the entries in catalog 123 corresponds to remote stored procedure 124 which is the remote stored procedure being requested by the user.

At step 350, the virtualization procedure generates a call signature using the search results that were provided by the remote database management system. The call signature is a statement that connects to the remote stored procedure in order to make use of its functionality. The remote stored procedure schema name, stored procedure package name and object name are specified based on the data provided by the user in the request. In one embodiment, a question mark (?) is added to the callable statement for every output parameter specified by the remote stored procedure. At predefined process 360, the virtualization procedure generates local stored procedure code that maps to the remote stored procedure (see FIG. 4 and corresponding text for processing details). The virtualization procedure processes the different remote stored procedure output parameters (data types) values, so that it can set the matching values of the local stored procedure input parameters and registers the output parameters depending on the remote data type mappings. The virtualization procedure then generates the local stored procedure source Java code where the output parameters of the local stored procedure get their final values. The virtualization procedure then compile the local stored procedure source Java code, by opening a new system process and executing 'javac [filename]' for compiling the Java source code. As shown, the resulting local stored procedure 150 is adapted to call remote stored procedure 124 with the correct connection string for the remote database management system and the correct invocation (syntax) for the remote stored procedure.

Figure 4:
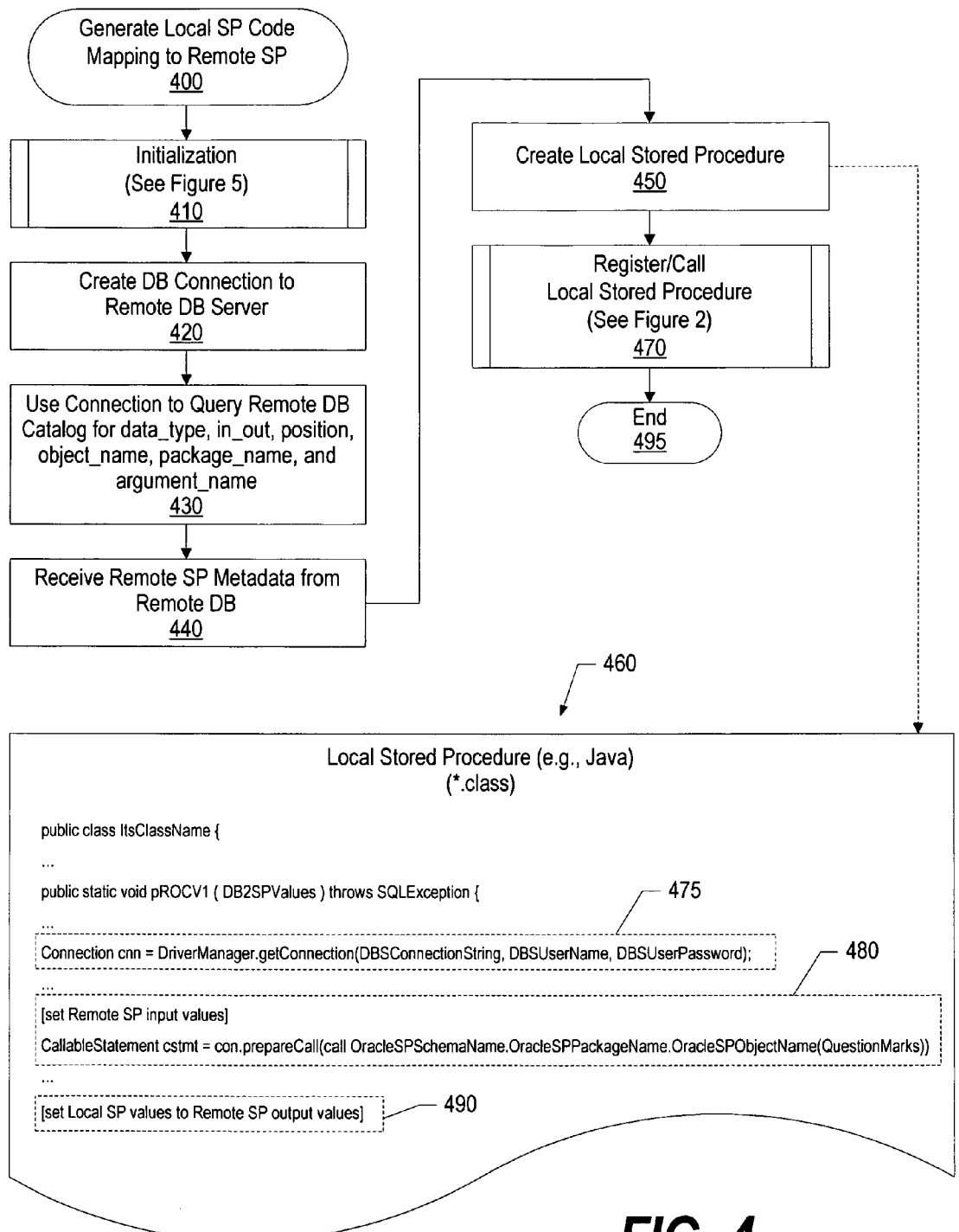
FIG. 4 is a flowchart showing the steps taken to generate local stored procedure code that maps to a remote stored procedure.

FIG. 4 is a flowchart showing the steps taken to generate local stored procedure code that maps to a remote stored procedure. Processing commences at 400 whereupon, at predefined process 410, initialization processing occurs (see FIG. 5 and corresponding text for initialization processing details). At step 420, the virtualization procedure creates a database connection to the remote database management system based upon the data supplied by the user in the request. At step 430, once a connection has been established with the remote database management system, the connection is used to query the database management system's catalog for various metadata. This metadata includes data type metadata, parameter metadata, and position metadata. The data type metadata is the data type of the parameter (e.g., text, integer, etc.). The position metadata defines the position of the given parameter (e.g., the first parameter, second parameter, etc.) in the call signature. The parameter metadata values define how the local stored procedure needs to handle the parameter (e.g., input parameters, output parameters, input/output parameters). In addition, the object name, package name, and argument name values are received from the remote database management system.

At step 440, the metadata that was requested in step 430 is received. This metadata is used to create the local stored procedure. An summary of the contents of an example local stored procedure are shown in local stored procedure example 460. Example 460 shows connection string 475 that is used to connect to the remote database management system. Example 460 further shows call statement 480 that is a statement that calls the remote stored procedure with the proper syntax and parameters used to call the particular remote stored procedure. Finally, example local stored procedure 460 includes statements 490 that set local stored procedure values to remote stored procedure output values that are returned by the remote stored procedure.

After the local stored procedure has been created, at predefined process 470, the local stored procedure is registered with the local database management system and then it can be invoked by the user of the local database management system or by another stored procedure running on the local database management system (see FIG. 2 and corresponding text for processing details). Processing thereafter ends at 495.

Figure 5:
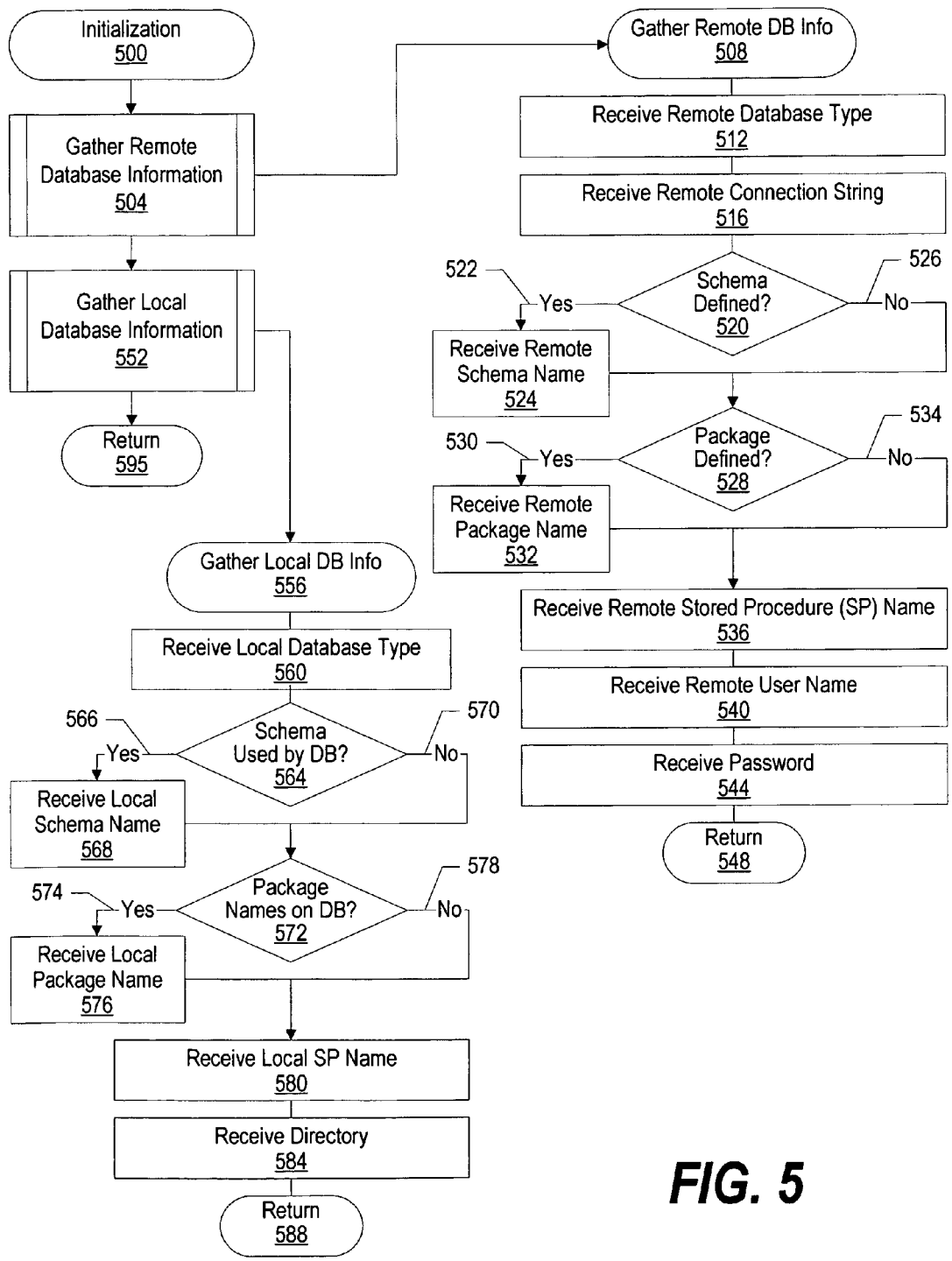
FIG. 5 is a flowchart showing the steps taken initialize the generation of the local stored procedure code that maps to the remote stored procedure.

FIG. 5 is a flowchart showing the steps taken initialize the generation of the local stored procedure code that maps to the remote stored procedure. Processing commences at 500 whereupon, at predefined process 504, the virtualization procedure gathers remote database information from the user. Gather remote database information commences at 508, whereupon, at step 512, the virtualization procedure receives the remote database type from the user. An example database type is "DB2," which is a type of database management system offered by International Business Machines Corporation. Another example database type is "Oracle," which is a type of database management system offered by Oracle Corporation. At step 516, the virtualization procedure receives the connection string that specifies how the remote database management system is accessed. Because schemas are not always used in a database management system, a determination is made as to whether a schema is defined (decision 520). If a schema is being used, decision 520 branches to "yes"

branch 522 whereupon, at step 524, the virtualization procedure receives the remote schema name. On the other hand, if a schema is not defined, decision 520 branches to "no" branch 526 bypassing step 524. Because packages are not always used in a database management system, a determination is made as to whether a package is defined (decision 528). If a package is defined, decision 528 branches to "yes" branch 530 whereupon, at step 532, the remote package name is received. On the other hand, if a package is not defined, decision 528 branches to "no" branch 534 bypassing step 532. At step 536, the virtualization procedure receives the name of the remote stored procedure that the user wishes to remotely execute. At steps 540 and 544, the virtualization procedure receives the user name and password, respectively, that are used to log into the remote database management system. Processing then returns at 548.

Returning to initialization processing, after the remote database information has been gathered, at predefined process 552, the data regarding the local database management system is gathered. The gathering of local database information commences at 556 whereupon, at step 560, the virtualization procedure receives the local database type. As previously mentioned, examples of two types of databases include "DB2" and "Oracle." A determination is made as to whether the local database management system uses schemas (decision 564). If the local database management system uses schemas, then decision 564 branches to "yes" branch 566 whereupon, at step 568, the virtualization procedure receives the name of the local database schema. On the other hand, if a schema is not used by the local database management system, then decision 564 branches to "no" branch 570 bypassing step 568. Another determination is made as to whether the local database management system uses package names (decision 572). If the local database management system uses package names, then decision 572 branches to "yes" branch 574 whereupon, at step 576, the virtualization procedure receives the name of the package on the local database management system from the user. On the other hand, if package names are not used, decision 572 branches to "no" branch 578 bypassing step 576.

At step 580, the virtualization procedure receives the name of the local stored procedure from the user. This is the name of the local stored procedure that will be generated by the virtualization procedure. At step 584, the directory is received from the user. This is the directory location where the local stored procedure files will be stored when they are generated by the virtualization procedure. Local database information gathering ends at 588 and initialization processing thereafter ends at 595. Processing then returns to the calling routine (see FIG. 4).

Figure 6:
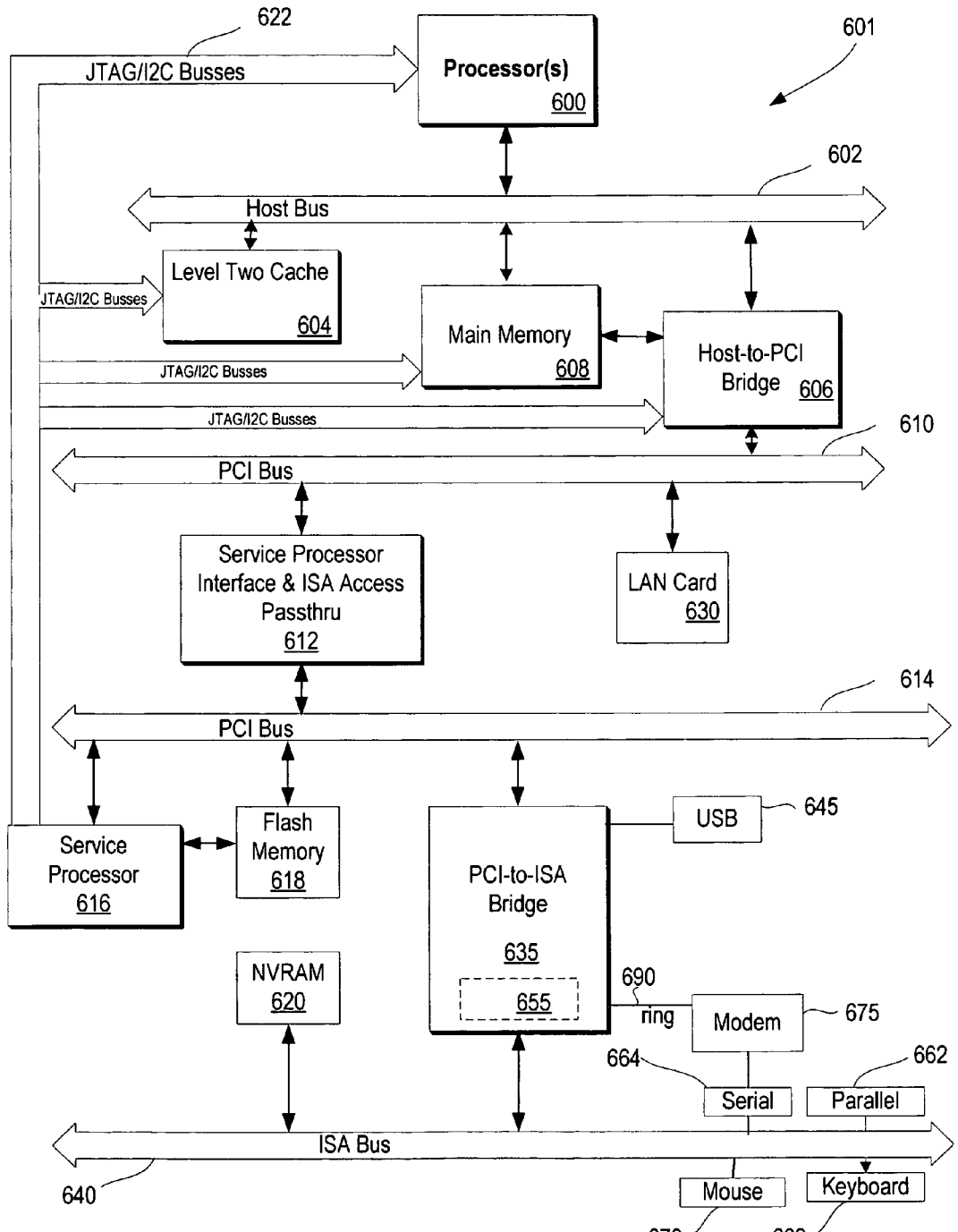
FIG. 6 is a block diagram of a computer system in which the present invention can be implemented.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
identifying a remote stored procedure stored in a remote database management system; and
automatically generating, by a processor, a local stored procedure stored in a local database management system, wherein the local stored procedure comprises connection code, invocation code, and data handling code, the automatic generating comprising:
gathering remote metadata corresponding to the remote database management system and the remote stored procedure, the remote metadata comprising a remote database type;
gathering local metadata corresponding to the local database management system, the local metadata comprising a local database type;
in response to gathering the remote metadata, generating the connection code, wherein the connection code comprises a connection string corresponding to the remote database management system;
in further response to gathering the remote metadata, creating the invocation code, wherein the invocation code comprises a call statement to the remote stored procedure based on the gathered remote metadata, the call statement mapping one or more input values from the local stored procedure to one or more input parameters corresponding to the remote stored procedure; and
in further response to gathering the remote metadata, creating the data handling code, wherein creating the data handling code comprises setting one or more local stored procedure values, the setting including mapping one or more remote stored procedure results, the remote stored procedure results output from the remote stored procedure, to the one or more local stored procedure values.

2. The method of claim 1 further comprising:
prior to the generating, searching a database catalog corresponding to the remote database management system;
receiving a search result from the searching; and
generating a call signature corresponding to the remote stored procedure based on the search result.

3. The method of claim 1 further comprising:
including data transforming code in the generated data handling code that, when executed, transforms a value included in the remote stored procedure results from a first data type used by the remote database management system to a second data type that is used by the local database management system.

4. The method of claim 1 further comprising:
executing the generated local stored procedure, the executing including:
calling the remote stored procedure using the created call statement;
receiving the remote stored procedure results in response to the calling; and
retrieving the local stored procedure values resulting from the setting.

5. The method of claim 4 wherein the executing further comprises:
connecting to the remote database management system using the connection string generated from the gathered remote metadata; and
transforming one or more values included in the remote stored procedure results from a first data type to a second data type, wherein the first data type is used by the remote database management system and the second data type is used by the local database management system.

6. The method of claim 5 further comprising:
displaying at least one of the transformed values to a user of the generated local stored procedure.

7. An information handling system comprising:
at least one processor;
at least one memory associated with the at least one processor;
a nonvolatile storage area associated with the at least one processor; and
a set of instructions contained within the at least one memory, wherein the at least one processor executes the set of instructions in order to perform actions of:
identifying a remote stored procedure stored in a remote database management system; and
automatically generating a local stored procedure stored in a local database management system, wherein the local stored procedure comprises connection code, invocation code, and data handling code, the automatic generating including:
gathering remote metadata corresponding to the remote database management system and the remote stored procedure, the remote metadata comprising a remote database type;
gathering local metadata corresponding to the local database management system, the local metadata comprising a local database type;
in response to gathering the remote metadata, generating the connection code, wherein the connection code comprises a connection string corresponding to the remote database management system;
in further response to gathering the remote metadata, creating the invocation code, wherein the invocation code comprises a call statement to the remote stored procedure based on the gathered remote metadata, the call statement mapping one or more input values from the local stored procedure to one or more input parameters corresponding to the remote stored procedure; and
in further response to gathering the remote metadata, creating the data handling code, wherein creating the data handling code comprises setting one or more local stored procedure values, the setting including mapping one or more remote stored procedure results, the remote stored procedure results output from the remote stored procedure, to the one or more local stored procedure values.

8. The information handling system of claim 7 wherein the set of instructions further comprises instructions to perform actions of:
   prior to the generating, searching a database catalog corresponding to the remote database management system;
   receiving a search result from the searching; and
   generating a call signature corresponding to the remote stored procedure based on the search result.

9. The information handling system of claim 7 wherein the set of instructions further comprises instructions to perform actions of:
   including data transforming code in the generated data handling code that, when executed, transforms a value included in the remote stored procedure results from a first data type used by the remote database management system to a second data type that is used by the local database management system.

10. The information handling system of claim 7 wherein the set of instructions further comprises instructions to perform actions of:
    executing the generated local stored procedure, the executing including:
    calling the remote stored procedure using the created call statement;
    receiving the remote stored procedure results in response to the calling; and
    retrieving the local stored procedure values resulting from the setting.

11. The information handling system of claim 10 wherein the instructions to perform the executing further comprises instructions to perform actions of:
    connecting to the remote database management system using the connection string generated from the gathered remote metadata; and
    transforming one or more values included in the remote stored procedure results from a first data type to a second data type, wherein the first data type is used by the remote database management system and the second data type is used by the local database management system.

12. A computer storage medium having a computer program product stored thereon, the computer storage medium comprising functional descriptive material that, when executed by a data processing system, causes the data processing system to perform actions that include:
    identifying a remote stored procedure stored in a remote database management system; and
    automatically generating a local stored procedure stored in a local database management system, wherein the local stored procedure comprises connection code, invocation code, and data handling code, the automatic generating including:
       gathering remote metadata corresponding to the remote database management system and the remote stored procedure, the remote metadata comprising a remote database type;
       gathering local metadata corresponding to the local database management system, the local metadata comprising a local database type;
       in response to gathering the remote metadata, generating the connection code, wherein the connection code comprises a connection string corresponding to the remote database management system;
       in further response to gathering the remote metadata, creating the invocation code, wherein the invocation code comprises a call statement to the remote stored procedure based on the gathered remote metadata, the call statement mapping one or more input values from the local stored procedure to one or more input parameters corresponding to the remote stored procedure; and
       in further response to gathering the remote metadata, creating the data handling code, wherein creating the data handling code comprises setting one or more local stored procedure values, the setting including mapping one or more remote stored procedure results, the remote stored procedure results output from the remote stored procedure, to the one or more local stored procedure values.

13. The computer storage medium of claim 12 further comprising additional functional descriptive material that, when executed by the data processing system, causes the data processing system to perform actions that include:
    prior to the generating, searching a database catalog corresponding to the remote database management system;
    receiving a search result from the searching; and
    generating a call signature corresponding to the remote stored procedure based on the search result.

14. The computer storage medium of claim 12 further comprising:
    including data transforming code in the generated data handling code that, when executed, transforms a value included in the remote stored procedure results from a first data type used by the remote database management system to a second data type that is used by the local database management system.

15. The computer storage medium of claim 12 further comprising additional functional descriptive material that, when executed by the data processing system, causes the data processing system to perform actions that include:
    executing the generated local stored procedure, the executing including:
    calling the remote stored procedure using the created call statement;
    receiving the remote stored procedure results in response to the calling; and
    retrieving the local stored procedure values resulting from the setting.

16. The computer storage medium of claim 15 wherein the executing further comprises additional functional descriptive material that, when executed by the data processing system, causes the data processing system to perform actions that include:
    connecting to the remote database management system using the connection string generated from the gathered remote metadata; and
    transforming one or more values included in the remote stored procedure results from a first data type to a second data type, wherein the first data type is used by the remote database management system and the second data type is used by the local database management system.

17. The computer storage medium of claim 16 further comprising additional functional descriptive material that, when executed by the data processing system, causes the data processing system to perform actions that include:
    displaying at least one of the transformed values to a user of the generated local stored procedure.

* * * * *